Patented Jan. 31, 1933

1,895,788

UNITED STATES PATENT OFFICE

LLOYD C. DANIELS, OF BUFFALO, NEW YORK, ASSIGNOR TO NATIONAL ANILINE & CHEMICAL COMPANY, INC., OF NEW YORK, N. Y., A CORPORATION OF NEW YORK

PROCESS OF MAKING ANTHRAQUINONES

No Drawing.    Application filed November 21, 1923.    Serial No. 676,163.

This invention relates to the manufacture and production of anthraquinone, or its derivatives or analogues.

It is well known that complex intermediate reaction products or compounds are formed when phthalic anhydride, or its derivatives such as, for example, chlorophthalic anhydride, etc., are condensed with benzene or derivatives of benzene, or with other aromatic hydrocarbons or their derivatives such as, for example, chlorobenzene, toluene, chlorotoluene, naphthalene, etc., by means of the Friedel-Crafts reaction using anhydrous aluminum chloride as the combining or condensing agent. The condensation reaction is usually carried out in the presence of a solvent, such as carbon disulfide, petroleum ether, benzene, etc. These complex reaction products or compounds, which appear to contain all of the aluminum and a part of the chlorine of the aluminum chloride entering into the reaction, are easily decomposed by dilute acids to give the corresponding free aromatic acylbenzoic acid. For example, in the condensation of phthalic anhydride with benzene by means of anhydrous aluminum chloride (the Friedel-Crafts reaction), and in the presence of an excess of benzene as solvent, hydrogen chloride is evolved and there is formed an intermediate complex reaction product or compound which upon subsequent treatment with dilute acid produces benzoyl-2-benzoic acid (o-benzoyl-benzoic acid). In a similar or analogous manner, p-toluyl-o-benzoic acid can be obtained from the complex compound produced by condensing phthalic anhydride with toluene, (chlor-4'-benzoyl)-2-benzoic acid from the product produced from phthalic anhydride and chlorobenzene, etc.

In the synthesis of anthraquinone, or its derivatives or analogues, hereinafter referred to generally as "anthraquinone bodies", it has been heretofore the practice, so far as I am aware, to first decompose and convert the complex intermediate reaction products or compounds above mentioned (hereinafter referred to generally as "o-aroylbenzoic-aluminum chloride compounds") into the corresponding free o-aroylbenzoic acid, and to subsequently subject the free acid thus obtained to the action of sulfuric acid, whereby an anthraquinone body is produced. For example, o-benzoyl-benzoic acid, p-toluyl-o-benzoic acid, or (chlor-4'-benzoyl)-2-benzoic acid when treated under suitable conditions with sulfuric acid of suitable strength give respectively anthraquinone, beta-methylanthraquinone, and beta-chloranthraquinone.

The present invention is based on the discovery that it is not necessary to prepare and isolate the free o-aroylbenzoic acids in the synthetic production of anthraquinone bodies but that anthraquinone bodies can be produced by treating the complex intermediate reaction-products above mentioned, that is, o-aroylbenzoic-aluminum chloride compounds, directly with sulfuric acid of suitable strength and under proper conditions. For example, I have found that the complex reaction-product obtained by condensing phthalic anhydride with benzene in the presence of anhydrous aluminum chloride and excess of benzene, and subsequently distilling off the excess of benzene, preferably under diminished pressure, gives, when treated with concentrated sulfuric acid under suitable conditions, an excellent yield of anthraquinone of good quality.

I have also found that beta-chloranthraquinone and beta-methylanthraquinone can be similarly produced by subjecting to the action of sulfuric acid their respective complex reaction-product, as obtained, for example, by condensing phthalic anhydride with chlorobenzene or with toluene respectively in the presence of aluminum chloride.

Other anthraquinone bodies may be similarly prepared from their corresponding o-aroylbenzoic-aluminum chloride compounds.

The complex reaction-products employed can be obtained and isolated in any suitable manner. For example, they may be obtained by condensing a phthalic anhydride body with an excess of an aromatic body by any suitable process and may be subsequently isolated in any suitable manner, for example, by distilling off the excess of the aromatic body, preferably under reduced pressure. The mass is preferably kept well stirred or agitated during the condensation and distillation. In the final reaction-product undecomposed aluminum chloride also may be present in addition to the o-aroylbenzoic-aluminum chloride compound, particularly when an excess of it has been used to bring about the condensation. Complex aluminum chloride compounds other than the o-aroylbenzoic-aluminum chloride compound may also be present.

In carrying out the invention, a preferred procedure is to gradually add the o-aroylbenzoic-aluminum chloride compound in a dry pulverized state, or in small lumps or particles, to sulfuric acid at a suitable temperature and to subsequently recover the anthraquinone so formed in any suitable and well known manner. In some cases it may be advantageous to use boric acid with the sulfuric acid.

The following specific examples will further illustrate the invention, but it is understood that the invention is not limited thereto. The parts are by weight.

*Example 1.*—1 part of the benzoylbenzoic-aluminum chloride compound (obtainable by condensing phthalic anhydride with benzene in the presence of anhydrous aluminum chloride and excess of benzene, and subsequently distilling off the excess benzene from the reaction-mass, preferably under diminished pressure at least toward the end of the distillation) is slowly added to about three parts of well stirred 98–100 percent sulfuric acid at a temperature of about 130°–135° C., care being taken that the reaction-mass does not foam over, it being controlled in part by the rate of mixing the ingredients. After all of the benzoylbenzoic-aluminum chloride compound has been added, the mixture is kept at a temperature of about 130°–140° C. for about an hour, or until the reaction is completed. The well stirred reaction-mass is then allowed to cool to about 100°–110° C., about 1 part of ice or cold water is then added, and the mixture is then poured into about 25–30 parts of water. On cooling, the anthraquinone is filtered off, washed with water and then with 3 percent caustic alkali solution, and finally with hot water until substantially free from alkali. It may be further purified in any suitable manner.

In the above example, sulfuric acid of other strengths, and also other temperatures, may be employed, for example, 90° to 180° C. As a rule, weaker acids require higher temperatures and stronger acids lower temperatures. For example, 75 percent sulfuric acid at about 160–180° C. or oleum containing about 10 to 15 percent free sulfuric anhydride at about 90°–100° C. may be employed. Within limits, the weaker the acid the greater the number of parts of it which are employed.

*Example 2.*—The initial materials, the specific conditions and the procedure are the same as given in Example 1, except that 0.9 part of (chlor-4'-benzoyl)-2-benzoic-aluminum chloride compound (obtainable by condensing phthalic anhydride with chlorobenzene in the presence of anhydrous aluminum chloride and excess of chlorobenzene and subsequently removing the excess chlorobenzene by distilling the reaction-mass under diminished pressure) is substituted in place of the 1 part of benzoylbenzoic-aluminum chloride compound.

If in Example 1, the benzoylbenzoic-aluminum chloride compound is replaced by an equivalent quantity of p-toluyl-o-benzoic aluminum chloride compound, there can be obtained beta-methylanthraquinone. Other o-aroylbenzoic-aluminum chloride compounds may also be substituted for the benzoylbenzoic-aluminum chloride compound.

In some cases the o-aroylbenzoic-aluminum chloride compound may be treated with sulfuric acid at temperatures as low as 40°–60° C. for the production of the corresponding anthraquinone body, for example, particularly in the naphthalene series.

The hydrogen chloride given off during the condensation by treating o-aroylbenzoic-aluminum chloride compounds with sulfuric acid, as well as the aluminum sulfate formed in the reaction, may be recovered in any suitable manner.

It will thus be seen that anthraquinone bodies can be prepared by the direct action of sulfuric acid on the complex intermediate reaction-products obtainable by the condensation of phthalic anhydride bodies with aromatic bodies such as benzene, toluene, chlorobenzene, etc. by means of the Friedel-Crafts reaction using anhydrous aluminum chloride as the condensing or combining agent.

The process has the advantage of avoiding the necessity of preparing and isolating the free o-aroylbenzoic acid bodies in the synthetic production of anthraquinones.

In the claims, it will be understood that the term "strong sulfuric acid" denotes sulfuric acid having a strength of about 70 to 100 per cent and oleum (that is, fuming sulfuric acid) which contains not to exceed 15 per cent free sulfuric anhydride.

I claim:

1. In the manufacture of an anthraquinone body from a reaction mixture containing an o-aroylbenzoic-aluminum chloride compound and a solvent with an amount of strong sulfuric acid sufficient to produce an anthraquinone body and recovering the anthraquinone body from the resulting mixture.

2. The process of making an anthraquinone body which comprises adding an o-aroylbenzoic-aluminum chloride compound to strong sulfuric acid maintained at a temperature not less than about 90° C.

3. The process of making an anthraquinone body which comprises adding an o-benzoylbenzoic-aluminum chloride compound to strong sulfuric acid maintained at a temperature not less than about 90° C.

4. The process of making an anthraquinone body which comprises adding o-benzoylbenzoic-aluminum chloride compound three times its weight of strong sulfuric acid maintained at a temperature of about 90° to 180° C.

5. The process of making an anthraquinone body which comprises heating an o-benzoylbenzoic-aluminum chloride compound with an amount of strong sulfuric acid sufficient to produce an anthraquinone body and recovering the anthraquinone body from the resulting mixture.

6. The process of making an anthraquinone body which comprises heating an o-benzoylbenzoic-aluminum chloride compound with about 75 per cent sulfuric acid at a temperature of about 160° to 180° C.

7. The process of making an anthraquinone body which comprises heating an o-benzoylbenzoic-aluminum chloride compound with about 10 to 15 per cent oleum at a temperature of about 90° to 100° C.

8. The process of making an anthraquinone body which comprises gradually adding an o-aroylbenzoic-aluminum chloride compound to strong sulfuric acid maintained at a temperature of about 90° to 180° C. whereby an anthraquinone body is produced.

9. The process of making an anthraquinone body which comprises heating an o-aroylbenzoic-aluminum chloride compound with strong sulfuric acid at a ring-closing temperature between 90° C. and 180° C. whereby an anthraquinone body is produced.

10. The process of making an anthraquinone body which comprises heating an o-benzoylbenzoic-aluminum chloride compound with 98 to 100 per cent sulfuric acid at a temperature of about 130° to 140° C.

In testimony whereof I affix my signature.

LLOYD C. DANIELS.

CERTIFICATE OF CORRECTION.

Patent No. 1,895,788. January 31, 1933

LLOYD C. DANIELS.

It is hereby certified that error appears in the printed specification of the above numbered patent requiring correction as follows: Page 2, line 121, claim 1, after "solvent" insert the words "the improvements which comprise distilling off the solvent under diminished pressure, and heating the residual mixture containing the o-aroylbenzoic-aluminum chloride compound"; and that the said Letters Patent should be read with this correction therein that the same may conform to the record of the case in the Patent Office.

Signed and sealed this 9th day of May, A. D. 1933.

M. J. Moore.

(Seal) Acting Commissioner of Patents.